United States Patent
Ye et al.

(10) Patent No.: US 10,893,548 B2
(45) Date of Patent: Jan. 12, 2021

(54) PHYSICAL RANDOM ACCESS CHANNEL DESIGN FOR LICENSED ASSISTED ACCESS

(71) Applicant: Intel IP Corporation, Santa Clara, CA (US)

(72) Inventors: Qiaoyang Ye, Fremont, CA (US); Jeongho Jeon, San Jose, CA (US); Seau S. Lim, South Wales (GB); Huaning Niu, San Jose, CA (US); Abhijeet Bhorkar, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 29 days.

(21) Appl. No.: 16/080,826

(22) PCT Filed: Jan. 25, 2017

(86) PCT No.: PCT/US2017/014855
§ 371 (c)(1),
(2) Date: Aug. 29, 2018

(87) PCT Pub. No.: WO2017/171999
PCT Pub. Date: Oct. 5, 2017

(65) Prior Publication Data
US 2019/0098661 A1 Mar. 28, 2019

Related U.S. Application Data

(60) Provisional application No. 62/316,092, filed on Mar. 31, 2016.

(51) Int. Cl.
*H04W 74/08* (2009.01)
*H04W 74/06* (2009.01)
(Continued)

(52) U.S. Cl.
CPC ......... *H04W 74/085* (2013.01); *H04W 16/14* (2013.01); *H04W 72/0453* (2013.01);
(Continued)

(58) Field of Classification Search
CPC ......... H04W 74/0808; H04W 74/0833; H04W 74/0816; H04W 74/085
See application file for complete search history.

(56) References Cited

U.S. PATENT DOCUMENTS

2014/0219204 A1* 8/2014 Park ..................... H04L 1/1822
370/329
2016/0345206 A1* 11/2016 Yerramalli .......... H04W 72/042
(Continued)

OTHER PUBLICATIONS

International Search Report dated Apr. 25, 2017 for International Application PCT/US2017/014855.
(Continued)

*Primary Examiner* — Elton Williams
(74) *Attorney, Agent, or Firm* — Schwabe, Williamson & Wyatt, P.C.

(57) ABSTRACT

An apparatus is configured to be employed within one or more user equipment (UE). The apparatus includes control circuitry and a transceiver. The control circuitry is configured to generate a physical random access channel (PRACH), wherein the PRACH includes a preamble for PRACH transmission using a license assisted access (LAA) secondary cell. The transceiver is coupled to the control circuitry and is configured to retry transmission of the PRACH on a listen before talk (LBT) failure based of the secondary cell.

13 Claims, 8 Drawing Sheets

(51) Int. Cl.
*H04W 16/14* (2009.01)
*H04W 72/04* (2009.01)
*H04W 72/12* (2009.01)
*H04W 74/02* (2009.01)
*H04W 88/06* (2009.01)

(52) U.S. Cl.
CPC ....... *H04W 72/1289* (2013.01); *H04W 74/02* (2013.01); *H04W 74/06* (2013.01); *H04W 74/0816* (2013.01); *H04W 88/06* (2013.01); *H04W 74/0808* (2013.01); *H04W 74/0833* (2013.01)

(56) References Cited

U.S. PATENT DOCUMENTS

| | | | |
|---|---|---|---|
| 2017/0027002 A1* | 1/2017 | Yerramalli | H04W 74/0808 |
| 2017/0231011 A1* | 8/2017 | Park | H04W 72/0446 |
| 2017/0347270 A1* | 11/2017 | Iouchi | H04W 16/14 |
| 2018/0167901 A1* | 6/2018 | Wang | H04W 74/006 |

OTHER PUBLICATIONS

"MAC impact for supporting UL transmission on LAA SCell." Source: Fujitsu. Agenda Item: 7.1.3. 3GPP TSG-RAN WG2 Meeting#89bis, Bratislava, Slovakia, Apr. 20-24, 2015. R2-151455. 5 pages.

"Initial Thoughts on LAA DL+UL Data Transmission." Source: ZTE. Agenda Item: 7.1.2. 3GPP TSG-RAN WG2#93, St. Julian's, Malta, Feb. 15-19, 2016. R2-161358. 4 pages.

"Discussion on PRACH for eLAA UL." Source: NTT Docomo, Inc. Agenda Item: 7.3.1.4. 3GPP TSG RAN WG1 Meeting #84, St. Julian's, Malta, Feb. 15-19, 2016. R1-160950. 5 pages.

International Preliminary Report on Patentability dated Oct. 11, 2018 for International Application PCT/US2017/014855.

* cited by examiner

PHYSICAL RANDOM ACCESS CHANNEL DESIGN FOR LICENSED ASSISTED ACCESS

RELATED APPLICATIONS

This application is a National Phase entry application of International Patent Application No. PCT/US2017/014855 filed Jan. 25, 2017, which claims priority to U.S. Provisional Application 62/316,092 filed on Mar. 31, 2016, entitled "PRACH DESIGN IN ELAA SYSTEMS" in the name of Qiaoyang Ye et al. and is hereby incorporated by reference in its entirety.

FIELD

The present disclosure relates to mobile communication and, more particularly to licensed assisted access (LAA) for mobile communications.

BACKGROUND

Mobile communication, including cellular communication, involves the transfer of data between mobile devices. The use of mobile communication is continuously increasing. Additionally, the bandwidth or data rate used and needed for mobile communications is continuously increasing.

One technique for improving the data rate is to improve spectral efficiency. However, the increases available by improving spectral efficiency are limited. Additionally, the amount of available licensed spectrum is also limited.

Another technique for improving the data rate for cellular communication is to increase the bandwidth by utilizing unlicensed bands or spectrums. The unlicensed bands are portions of the frequency spectrum used by other technologies and/or services, such as WiFi and the like. The unlicensed bands cannot be restricted for use by only cellular devices, unlike the licensed bands. Thus, the use of the unlicensed bands can be problematic. For example, the use can interfere with the other technologies and/or services.

Techniques are needed to improve the bandwidth or data rate for telecommunication by utilizing unlicensed bands without interfering with other technologies and/or services.

DETAILED DESCRIPTION

Figure 1:
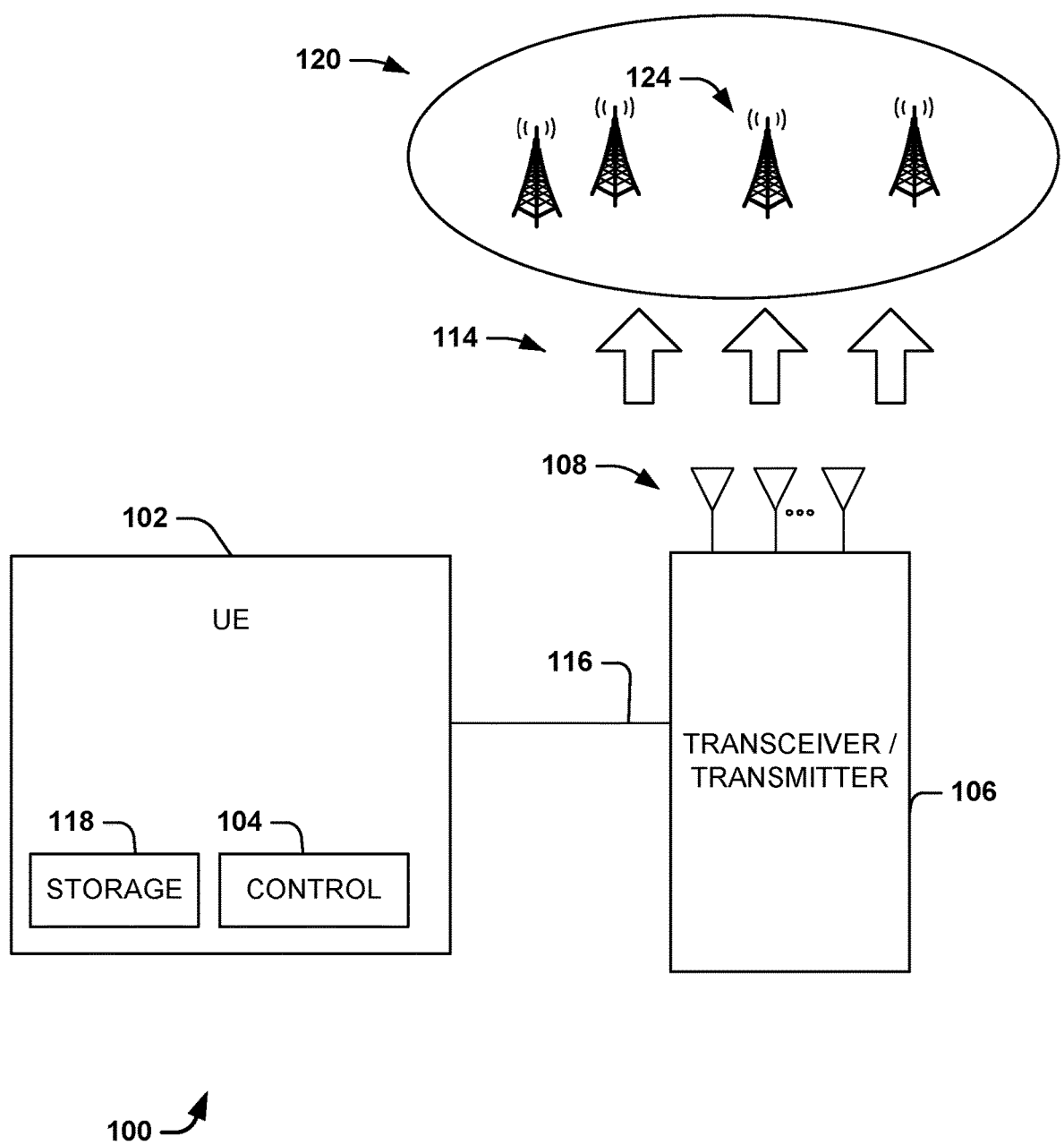
FIG. 1 is a diagram illustrating an arrangement for mobile communications utilizing unlicensed frequency bands.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC, an electronic circuit and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

A technique for improving the data rate for cellular communication is to utilize unlicensed bands or spectrums. The unlicensed bands are portions of the frequency spectrum used by other technologies and/or services, such as WiFi and the like. The unlicensed bands cannot be restricted for use by only cellular devices or licensees, unlike the licensed bands. Thus, the use of the unlicensed bands can be problematic. For example, the use can interfere with the other technologies and/or services.

With mature physical layer techniques, further improvement in the spectral efficiency may be marginal. The scarcity of licensed spectrum in low frequency band prevents substantial increases in the data rate. Thus, there are emerging interests in the operation of LTE systems in unlicensed spectrum.

One enhancement for LTE in 3GPP Release 13 is enable its operation in the unlicensed spectrum via Licensed-Assisted Access (LAA), which expands the system bandwidth by utilizing the flexible carrier aggregation (CA) framework introduced by the LTE-Advanced system.

Potential LTE operation in unlicensed spectrum includes, but is not limited to, the LTE operation in the unlicensed spectrum via dual connectivity (DC)—called DC based LAA, and the standalone LTE system in the unlicensed spectrum, where LTE-based technology solely operates in unlicensed spectrum without requiring an "anchor" in licensed spectrum, referred to as MulteFire.

An unlicensed frequency band of interest in 3GPP is the 5 GHz band, which has wide spectrum with global common availability. The 5 GHz band in the US is governed by Unlicensed National Information Infrastructure (U-NII) rules by the Federal Communications Commission (FCC). The main incumbent system in the 5 GHz band is the Wireless Local Area Networks (WLAN), specifically those based on the IEEE 802.11 a/n/ac technologies. Since WLAN systems are widely deployed both by individuals and operators for carrier-grade access service and data offloading, suitable techniques should be employed. Listen-Before-Talk (LBT) is a feature of Rel-13 LAA system for coexistence with other systems. LBT is a procedure whereby radio transmitters first sense the medium and transmit only if the medium is sensed to be idle.

UEs can establish communications by following a random access procedure. This procedure includes a UE using an LTE physical random access channel (PRACH). The UE transmits a PRACH preamble, which includes a cyclic prefix (CP), a sequence and a guard time.

A UE can utilize an unlicensed frequency band to transmit the PRACH preamble. However, using an unlicensed frequency band requires that the UE performs a listen before talk (LBT) before transmitting. If the LBT indicates that the unlicensed frequency band is unavailable, transmission of the PRACH preamble is blocked and the attempted establishment of communications are delayed.

Embodiments and variations thereof are disclosed that include suitable approaches for using unlicensed frequency bands that mitigate and/or reduce blocking of transmissions. The embodiments also facilitate utilization of unlicensed frequency bands. The approaches include retrying transmissions on unlicensed frequency bands, using multiple cells located in unlicensed frequency bands, identifying unlicensed cells prior to transmission, and using licensed frequencies as a fallback.

FIG. 1 is a diagram illustrating an arrangement 100 for mobile communications utilizing unlicensed frequency bands. The arrangement enhances transmission probabilities by incorporation approaches including retrying transmissions, using multiple unlicensed frequency bands (or SCells) simultaneously, using a licensed frequency band as a fallback, and the like. The arrangement 100, can also be an apparatus, and facilitates communications utilizing unlicensed frequency bands.

The arrangement 100 includes a user equipment (UE) device 102, a transceiver 106, and network entities 120. The network entities 120 include components such as, but not limited to, a packet gateway (PGW), a secondary gateway (SGW), a mobility management entity (MME), a packet data network (PDN), UEs, evolved Node Bs (eNodeB), and the like. For illustrative purposes, an eNodeB 124 is shown as one of the network entities.

The UE 102 includes the transceiver 106, a storage component 118, and control circuitry or controller 104. The storage component 118 includes a memory, storage element and the like and is configured to store information for the UE 102. The controller 104 is configured to perform various operations associated with the UE 102. The controller 104 can include logic, components, circuitry, one or more processors and the like. The transceiver 106 includes transmitter functionality and receiver functionality. The UE 102 also includes one or more antenna 108 for communications with the network entities 120.

The eNodeB 124 includes a transceiver, a storage component, and control circuitry or controller. The storage component includes a memory, storage element and the like and is configured to store information for the eNodeB 124. The controller is configured to perform various operations associated with the eNodeB 124. The controller can include logic, components, circuitry, one or more processors and the like. The transceiver 106 includes transmitter functionality and receiver functionality. The eNodeB 124 can also include one or more antenna for communications with the network entities 120 and/or other UEs.

The UE 102 is configured to establish uplink communications with the evolved node B (eNodeB) 124 of the network entity using an unlicensed frequency band. The eNodeB generates and transmits a physical downlink control channel (PDCCH) that includes a PDCCH order. The PDCCH includes control information and resource assignments for the UE 102. The PDCCH also includes the PDCCH order, which specifies an order or procedure to a random access procedure (RACH) for the UE 102 with the eNodeB 124. The UE 102 responds to the PDCCH order from the eNodeB 124 by generating and transmitting a physical resource allocation channel (PRACH) preamble. The preamble is a random access preamble for a random access procedure. The PRACH preamble includes a cyclical prefix (CP), a sequence, a guard time and the like. The PRACH preamble is transmitted by the UE 102. The eNodeB 124 decodes the PRACH preamble and generates a random access response (RAR) based on the PRACH preamble. The eNodeB 124 transmits the RAR, which is expected to be received by the UE 102 within a RAR window. The RAR window is a period of time or duration in which the UE 102 expects to receive the RAR from the eNodeB 124. It is appreciated that the UE 102 can establish communications with other network entities.

Cell aggregation (CA) is used to arrange and utilize secondary cells with primary cells. A primary cell is a cell that uses a licensed frequency band. A secondary cell can use a license frequency band or an unlicensed frequency band. Cells can also be co-located and non-collocated. The co-located cells are located next to each other. Non-collocated cells are cells that are not located next to each other.

The non-collocated cells use a different timing advance (TA). Thus, multiple TA groups (TAGs) are supported, where the TAG refers to a group of serving cells that is configured by radio resource control (RRC) protocols to use the same timing reference cell and the same TA value. A TAG containing the primary cell is called a primary TAG (pTAG) and a TAG not containing the primary cell is called a secondary TAG (sTAG), which contains at least one secondary cell with a configured uplink.

The CA can be used to aggregate unlicensed frequency bands with licensed frequency bands by aggregating a PCell with one or more SCells. The UE 102 and/or the eNodeB 124 utilize the CA to utilize unlicensed frequency bands with licensed frequency bands and improve or enhance data rates. The CA can aggregate licensed and/or unlicensed frequency bands into component carriers (CC). The PCell and the SCells can be referenced by an index referred to as a Cell index.

The eNodeB 124 can be configured to utilize SCells to transmit the PDCCH order. The eNodeB 124 performs a listen before talk (LBT) process to determine if an SCell is available. The eNodeB 124 is configured to retry transmission with the SCell until transmission is successful, or a selected number of attempts have been made. Once the selected number of attempts have been made, the transmission can be blocked. Alternately, a PCell can be used as a fallback to perform the transmission. Of course, the eNodeB 124 can also be configured to initially use the PCell.

The LBT or LBT process includes sensing the unlicensed frequency band or channel associated with the SCell. If the energy is sensed above a threshold, the frequency band is considered not available. The LBT process is considered failed. If the sensed signal is below the threshold, the frequency band is considered available and idle. The LBT can be single interval LBT or Cat-4 LBT. If Cat-4 LBT is used, PDCCH order can be followed by PDSCH within the same subframe, and the multiplexing rule follows the Cat-4 LBT multiplexing rule.

The eNodeB 124 can be configured to utilize SCells to transmit the RAR within a time period so that the RAR is received at the UE 102 within the RAR window. The eNodeB 124 performs an LBT process to determine if an SCell is available. The eNodeB 124 is configured to retry transmission with the SCell until transmission is successful, or a selected number of attempts has been made. Once the selected number of attempts have been made, the transmission can be blocked. A PCell can be used as a fallback to perform the transmission. The eNodeB 124 can also be configured to initially use the PCell. In another example, the RAR window is extended to accommodate extra processing time for using the SCell.

The UE 102 can be configured to utilize SCells to transmit the PRACH preamble in response to a PDCCH. The UE 102 performs an LBT process to determine if an SCell is available. The SCell can be the same as the SCell transmitting the corresponding PDCCH order. Alternatively, the SCell can be a different SCell, which can be indicated explicitly in PDCCH order, or be indicated via RRC signaling by defining a mapping from SCell transmitting PDCCH order to set of SCells to transmit PRACH preamble, or can be any SCells configured to the UE. The UE 102 is configured to retry transmission with the SCell until transmission is successful, or a selected number of attempts has been made. Once the selected number of attempts have been made, the transmission can be blocked. A PCell can be used as a fallback to perform the transmission and is used based on a fallback condition. The fallback condition includes a number of LBT failures on the SCell, a number of continuous LBT failures, a number of LBT failures within a time window, configured by layer 1 signaling, configured by higher layer signaling, and the like. The UE 102 can also be configured to initially use the PCell.

In another example, the UE 102 is configured to monitor a common search space (CSS) over a licensed assisted access (LAA) secondary cell (SCell). By monitoring the CSS, the UE 102 can receive RAR from these SCells. As a result, the identified SCell can be used for transmitting the RAR. Thus, an unlicensed frequency band associated with the SCell is used in place of the licensed frequency band associated with the PCell for RAR transmission. The RAR can be transmitted in the same SCell as where the PRACH preamble is transmitted. Alternatively, the RAR can be transmitted in a different SCell. In one example, a RAR window for receiving the PRACH preamble is widened or extended if RAR is transmitted on unlicensed spectrum. In another example, the RAR window may only count a valid downlink subframe, if RAR is transmitted over unlicensed spectrum.

Other examples and variations for enhancing communications for unlicensed frequency bands are shown below and in subsequent figures.

The performed LBT can be single interval LBT or Cat-4 LBT. If Cat-4 LBT is used, PDCCH order can be followed by PDSCH within the same subframe, and the multiplexing rule follows the Cat-4 LBT multiplexing rule.

PRACH preamble: single interval LBT can be used, for both within and outside transmission opportunity (TxOP).

Cat-4 LBT with higher priority can be used if RAR is transmitted on unlicensed spectrum. RAR can be multiplexed with other traffic, and the multiplexing rule follows the Cat-4 LBT multiplexing rule.

Periodic resources can be semi-statically configured by higher layer signaling (e.g. RRC signaling) for PRACH preamble transmission.

The PRACH transmission can be scheduled via PDCCH order. The timing relationship between PDCCH order and the PRACH preamble transmission can be predefined, semi-statically configured (e.g. via radio resource control (RRC) signaling), or dynamical configured via downlink control information (DCI).

A timing window can be configured and the PRACH preamble can be transmitted in one subframe within the timing window, depending on channel availability. The scheduling coordination of different PRACH preamble transmissions by eNodeB implementation avoids the ambiguity of random access-radio network temporary identifier (RA-RNTI) for RAR corresponding to different preamble transmissions. The configuration of timing window length can to take into account the RAR window size.

One PDCCH order can indicate multiple PRACH resources, each on separate LAA SCells within the same sTAG. The UE 102 performs LBT over all these configured SCells and the PRACH preamble can be transmitted on any one or multiple of the configured SCell(s) if its channel is sensed to be idle/available. The configuration of the SCells to reserve PRACH resources can be semi-statistical via RRC-signaling, or dynamical via L1 signaling (e.g. DCI). Similarly, the PDCCH order and/or RAR (if transmitted on SCell) resources can be allocated to multiple SCells, and PDCCH order and/or RAR would be transmitted on any one of these SCells if its channel is sensed to idle/available.

Alternatively, a Cat-4 LBT can be performed prior to PDCCH order, and downlink (DL) data or reservation signal if no data can be transmitted until the time for the UE 102 to perform a single-interval or no LBT prior to PRACH preamble transmission. The channel can be held within the duration between PDCCH order and PRACH preamble transmissions, and thus the transmission probability for PRACH preamble is improved.

If the PDCCH order and/or RAR is transmitted on LAA SCells, PDCCH order and/or RAR can be transmitted over PCell as a fallback, if the transmission was not successful for a duration of X ms or the SCell failed to transmit Y consecutive PUCCH transmission opportunities due to LBT failure, where X and Y can be set by L1/L2 signaling.

When the PRACH preamble is transmitted over unlicensed carrier, the UE does not increase preamble counter when LBT fails. Thus, there is no power ramping when the PRACH preamble fails to transmit due to LBT.

Figure 2:
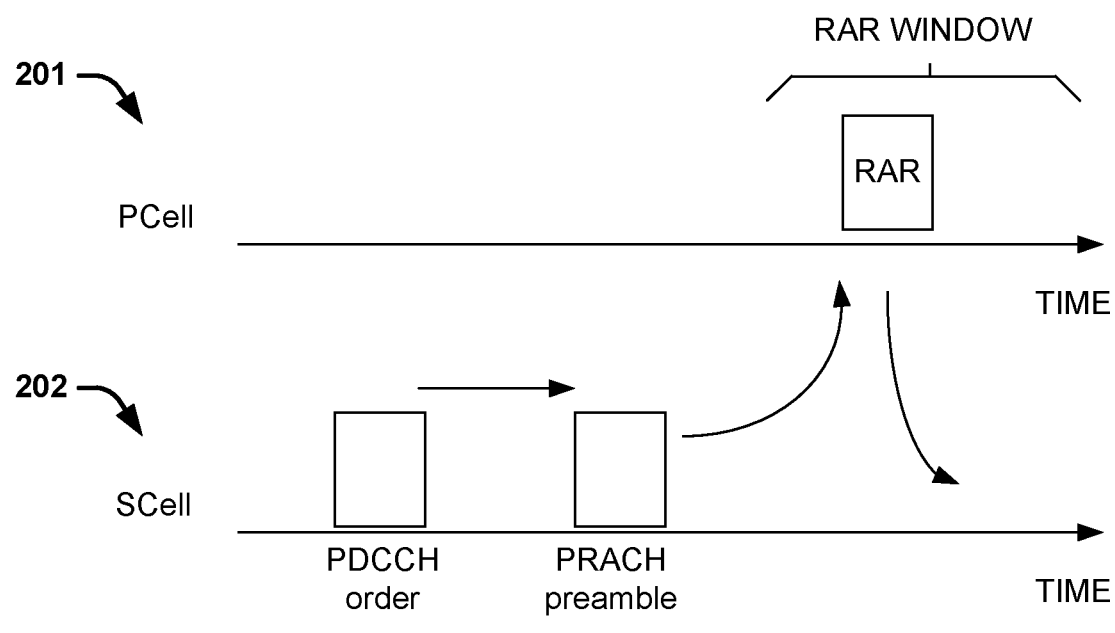
FIG. 2 is a diagram illustrating establishment of communications for a user equipment (UE) using a PRACH preamble

FIG. 2 is a diagram illustrating establishment of communications for a user equipment (UE) using a PRACH preamble.

In this example, uplink communications between a UE and eNodeB are established using a primary cell (PCell) 201 and a secondary cell (SCell) 202. The primary cell 201 is a cell operating on a primary frequency within a licensed frequency band. The secondary cell 202 can use an unlicensed or licensed frequency band. In this example, the secondary cell 202 is assumed to use an unlicensed frequency band.

An eNodeB generates a PDCCH, which includes a PDCCH order and transmits the PDCCH order using the SCell 202. The eNodeB performs a LBT process to determine if the unlicensed frequency band is available, or the PDCCH order is not transmitted. The UE receives the PDCCH and generates a PRACH preamble using the SCell 202. However, before the UE transmits the PRACH preamble, the UE performs a LBT process to determine if the unlicensed frequency band is available. If the unlicensed frequency band is available, the PRACH preamble is transmitted using the SCell 202. If the unlicensed frequency band is unavailable, transmission of the PRACH preamble is blocked.

An eNodeB receives the PRACH preamble, assuming it was transmitted. The eNodeB generates RAR using the PCell 201. The RAR is then received by the UE within the RAR window and the PCell 201 and/or the SCell 202 can be utilized for uplink communications.

Figure 3:
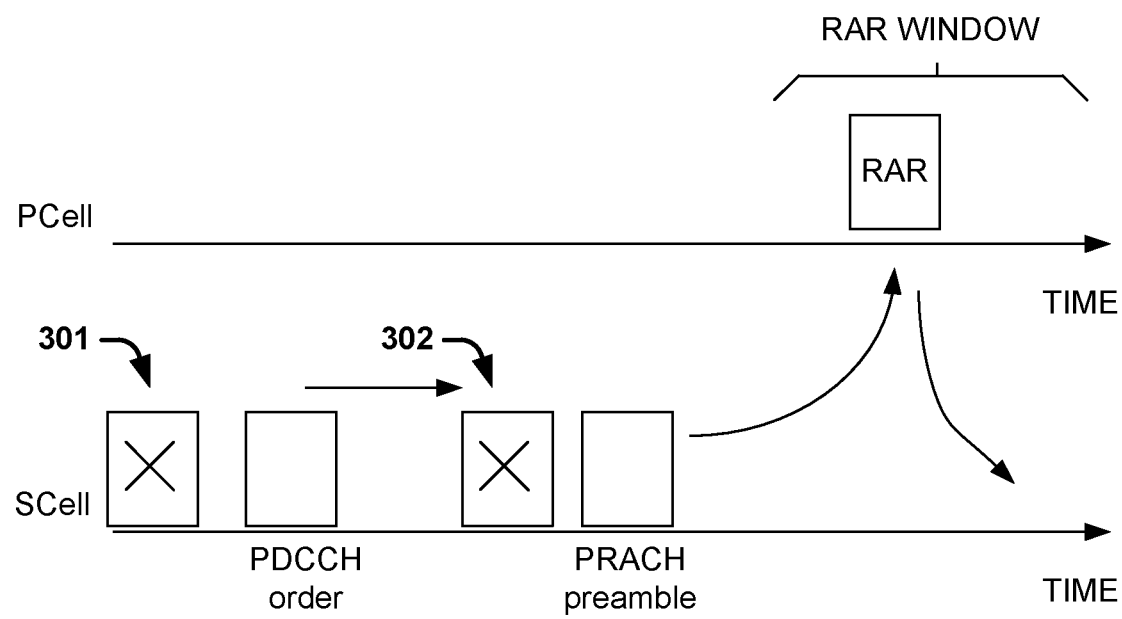
FIG. 3 is a diagram illustrating establishment of communications for a user equipment (UE) where RAR is transmitted using a primary cell.

FIG. 3 is a diagram illustrating establishment of communications for a user equipment (UE) where RAR is transmitted using a PCell. In this example, retries after LBT failures are performed to increase probability of PRACH preamble transmission.

In this example, uplink communications between a UE and eNodeB are established using a primary cell (PCell) and a secondary cell (SCell). The primary cell is a cell operating on a primary frequency within a licensed frequency band. The secondary cell can use an unlicensed or licensed frequency band. In this example, the secondary cell is assumed to use an unlicensed frequency band.

An eNodeB generates a PDCCH, which includes a PDCCH order and transmits the PDCCH order using the SCell. The eNodeB performs a LBT process to determine if the unlicensed frequency band is available. On a first attempt 301, the LBT process results in a failure as the energy above a threshold value is detected. However, a retry is performed, where the LBT process results in success as a detected energy is below the threshold value. The eNodeB is configured to retry transmitting the PDCCH until the PDCCH is transmitted and/or a selected number of failed LBT processes are obtained.

The UE receives the PDCCH and generates a PRACH preamble using the SCell. Before the UE transmits the PRACH preamble, the UE performs a LBT process to determine if the unlicensed frequency band is available. In this example, the LBT process for the first attempt 302 results in failure. However, the UE is configured to retry transmitting the PRACH preamble. In the second attempt at transmission, the LBT is successful and the PRACH preamble is transmitted by the UE using the SCell. Had the second attempt resulted in an LBT failure, the UE is configured to retry transmission using LBT until the PRACH preamble is transmitted and/or a selected number of retries of failed LBT processes have occurred and/or the time window if configured for this PRACH preamble expires. The PRACH can be transmitted only on available resources for PRACH transmission, where the available resources may be indicated implicitly/explicitly via downlink control information (DCI), or configured via RRC signaling.

An eNodeB receives the PRACH preamble. The eNodeB generates RAR using the PCell. The RAR is then received by the UE within the RAR window and the PCell and the SCell can be utilized for uplink communications.

Figure 4:
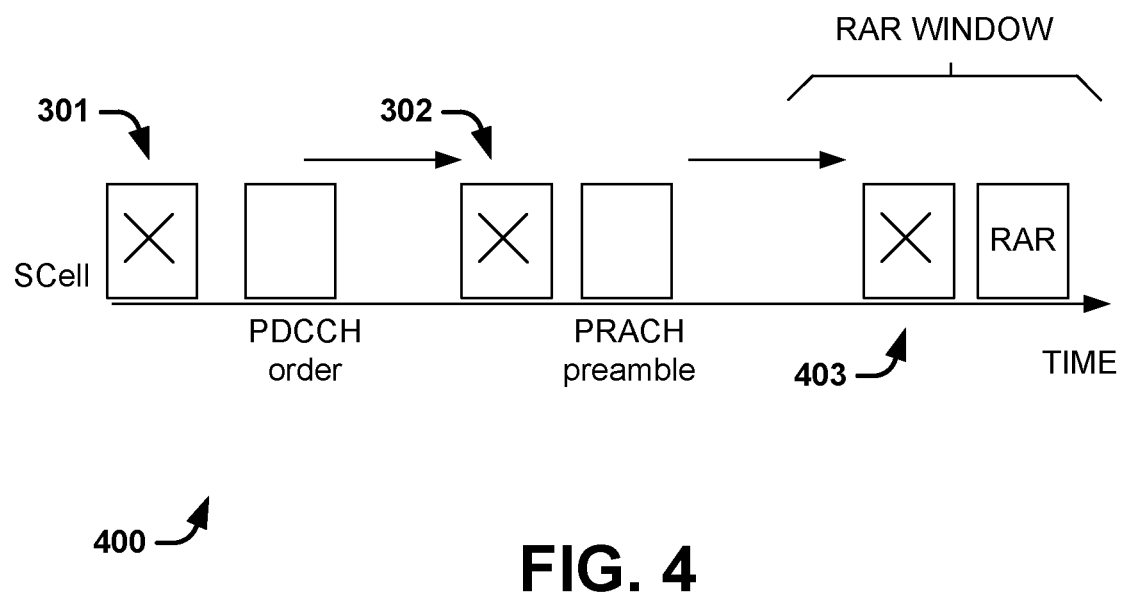
FIG. 4 is a diagram illustrating establishment of communications for a user equipment (UE) where RAR is transmitted using a secondary cell.

FIG. 4 is a diagram illustrating establishment of communications for a user equipment (UE) where RAR is transmitted using a SCell. In this example, retries after LBT failures are performed to increase probability of PRACH preamble transmission.

In this example, uplink communications between a UE and eNodeB are established using only a secondary cell (SCell). The primary cell is a cell operating on a primary frequency within a licensed frequency band. The secondary cell can use an unlicensed or licensed frequency band. In this example, the secondary cell is assumed to use an unlicensed frequency band.

An eNodeB generates a PDCCH, which includes a PDCCH order and transmits the PDCCH order using the SCell. The eNodeB performs a LBT process to determine if the unlicensed frequency band is available. On a first attempt 301, the LBT process results in a failure as the energy above a threshold value is detected. A retry is performed, where the LBT process results in success as a detected energy is below the threshold value. The eNodeB can retry transmitting the PDCCH until the PDCCH is transmitted and/or a selected number of failed LBT processes are obtained.

The UE receives the PDCCH and generates a PRACH preamble based on the PDCCH order and using the SCell. Before the UE transmits the PRACH preamble, the UE performs a LBT process to determine if the unlicensed frequency band is available. In this example, the LBT process for the first attempt 302 results in failure. However, the UE is configured to retry transmitting the PRACH preamble. In the second attempt at transmission, the LBT is successful and the PRACH preamble is transmitted by the UE using the SCell. Had the second attempt resulted in an LBT failure, the UE is configured to retry transmission using LBT until the PRACH preamble is transmitted and/or a selected number of retries of failed LBT processes have occurred and/or the time window if configured for this PRACH preamble expires. The PRACH can be transmitted only on available resources for PRACH transmission, where the available resources may be indicated implicitly/explicitly via DCI, or configured via RRC signaling.

An eNodeB receives the PRACH preamble. The eNodeB generates RAR using the SCell. Because the SCell utilizes an unlicensed frequency band, the eNodeB performs LBT. If the LBT results in failure as shown at 403, a retry is performed. In this example, the retry is successful and the SCell is utilized. The RAR is then received by the UE within the RAR window.

Figure 5:
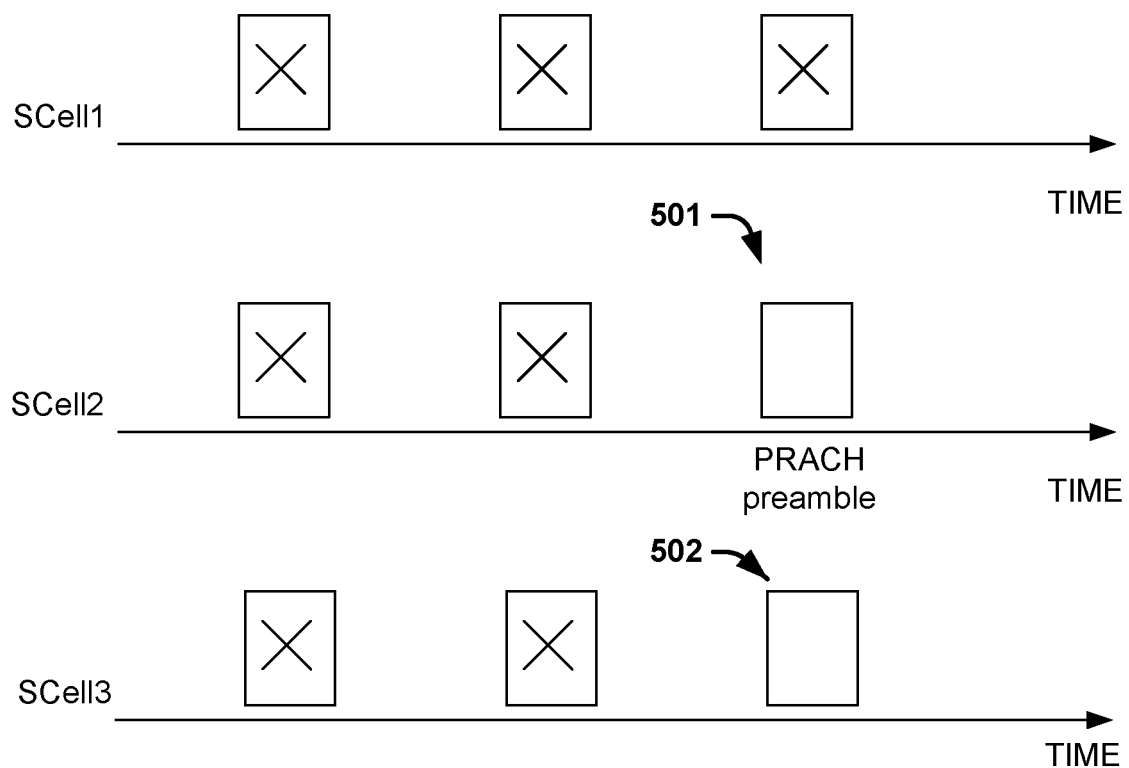
FIG. 5 is a diagram illustrating establishment of communications for a user equipment (UE) where multiple secondary cells are used.

FIG. 5 is a diagram illustrating establishment of communications for a user equipment (UE) where multiple secondary cells are used. In this example, a plurality of secondary cells (SCells) are used for PRACH preamble transmission.

The secondary cell can use an unlicensed or licensed frequency band. In this example, the secondary cell is assumed to use an unlicensed frequency band and uses LBT before transmissions.

In this example, the UE has already received and processed the PDCCH order and generated a PRACH preamble. The plurality of secondary cells includes SCell1, SCell2, and SCell3, however it is appreciated that other suitable numbers of secondary cells can be utilized.

A LBT is performed prior to each transmission attempt. A first attempt using SCell1 is tried, but results in LBT failure. A first attempt using SCell2 is tried, but results in LBT failure. A first attempt using SCell3 is tried, but also results in LBT failure. However, the UE is configured to retry transmission of the PRACH preamble until successful transmission or a selected number of attempts have been tried.

A second attempt using SCell1 is tried, but results in LBT failure. A second attempt using SCell2 is tried, but results in LBT failure. A second attempt using SCell3 is tried, but also results in LBT failure. At this point, the UE has not been able to transmit the PRACH preamble.

A third attempt using SCell1 is tried, but results in LBT failure. A third attempt using SCell2 is tried, and results in LBT success. The UE uses the SCell2 to transmit the PRACH preamble at 501. A third attempt using SCell3 is also tried. The LBT process is successful at 502, however the UE has already transmitted the PRACH preamble and the PRACH preamble is not retransmitted. In one example, when multiple cells have channels idle, UE can select one of these cells for PRACH transmission, and a selection rule can be predefined, e.g. select the SCell with smallest cell index. Alternatively, UE may transmit PRACH on multiple cells.

As a result, the probability of successful PRACH preamble transmission is increased and unlicensed frequency bands are utilized.

Figure 6:
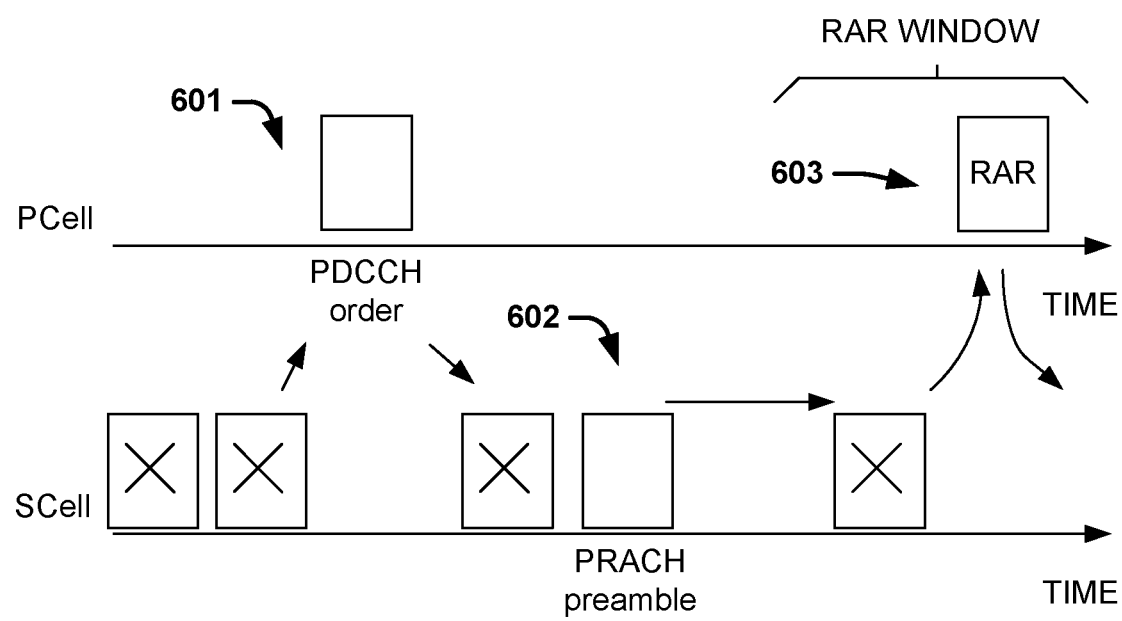
FIG. 6 is a diagram illustrating establishment of communications for a user equipment (UE) utilizing retries with a secondary cell and fallbacks to a primary cell.

FIG. 6 is a diagram illustrating establishment of communications for a user equipment (UE) utilizing retries with a secondary cell and fallbacks to a primary cell. Transmissions blocked due to LBT failure are retried a number of times using a secondary cell. Then, the retransmission is performed using the primary cell as a fallback.

The primary cell is a cell operating on a primary frequency within a licensed frequency band. The secondary cell can use an unlicensed or licensed frequency band. In this example, the secondary cell is assumed to use an unlicensed frequency band.

An eNodeB generates a PDCCH, which includes a PDCCH order. The eNodeB attempts to transmit the PDCCH order using the SCell. However, the attempt results in LBT failure. The eNodeB again attempts to transmit the PDCCH order using the SCell, which again results in LBT failure. The eNodeB can retry transmission using the SCell a selected number of times. In this example, the selected number is 2. Thus, instead of using the SCell, the eNodeB performs transmission of the PDCCH order using the PCell 601. No LBT is required for the PCell, thus the transmission is performed.

The UE receives the PDCCH and generates a PRACH preamble based on the PDCCH order. The UE performs a LBT process to determine if the unlicensed frequency band is available prior to transmission. In this example, the LBT process for the first attempt results in failure. However, the UE is configured to retry transmitting the PRACH preamble. In the second attempt at transmission 602, the LBT is successful and the PRACH preamble is transmitted by the UE using the SCell. Had the second attempt resulted in an LBT failure, the UE is configured to fallback to using the PCell based on a fallback condition. The fallback condition can include a selected number of LBT failures, a selected number of continuous LBT failures within a time window, configured by layer 1 signaling, configured by higher layer signaling, and the like. It is appreciated that other numbers of retries can be utilized. The number of retries can be predefined, configured via RRC signaling and the like.

An eNodeB receives the PRACH preamble. The eNodeB generates RAR based on the PRACH preamble. The eNodeB attempts to use the SCell for transmission of the RAR, however the LBT results in failure. Because the SCell utilizes an unlicensed frequency band, the eNodeB performs LBT. In this example, the eNodeB fallsback to the PCell for transmission. The RAR is transmitted using the PCell at 603 within the RAR window.

The retries using the SCell facilitate use of the unlicensed frequency band and improves the probability of transmission. Using the PCell as a fallback further improves the probability of transmission, but can result in utilizes licensed frequency bands.

An eNodeB generates a PDCCH, which includes a PDCCH order and transmits the PDCCH order. using the SCell. The eNodeB performs a LBT process to determine if the unlicensed frequency band is available. On a first attempt 301, the LBT process results in a failure as a signal above a threshold value is detected. A retry is performed, where the LBT process results in success as a detected signal is below the threshold value. The eNodeB is configured to retry transmitting the PDCCH until the PDCCH is transmitted and/or a selected number of failed LBT processes are obtained.

The UE receives the PDCCH and generates a PRACH preamble based on the PDCCH order and using the SCell. Before the UE transmits the PRACH preamble, the UE performs a LBT process to determine if the unlicensed frequency band is available. In this example, the LBT process for the first attempt 302 results in failure. However, the UE is configured to retry transmitting the PRACH preamble. In the second attempt at transmission, the LBT is successful and the PRACH preamble is transmitted by the UE using the SCell. Had the second attempt resulted in an LBT failure, the UE is configured to retry transmission using LBT until the PRACH preamble is transmitted and/or a selected number of retries of failed LBT processes have occurred, and/or the time window if configured for this PRACH preamble expires. The PRACH can be transmitted only on available resources for PRACH transmission, where the available resources may be indicated implicitly/explicitly via DCI, or configured via RRC signaling.

An eNodeB receives the PRACH preamble within a RAR window. The eNodeB generates RAR using the SCell. Because the SCell utilizes an unlicensed frequency band, the eNodeB performs LBT. If the LBT results in failure as shown at 403, a retry is performed. In this example, the retry is successful and the SCell is utilized. The RAR is then received by the UE within the RAR window.

Figure 7:
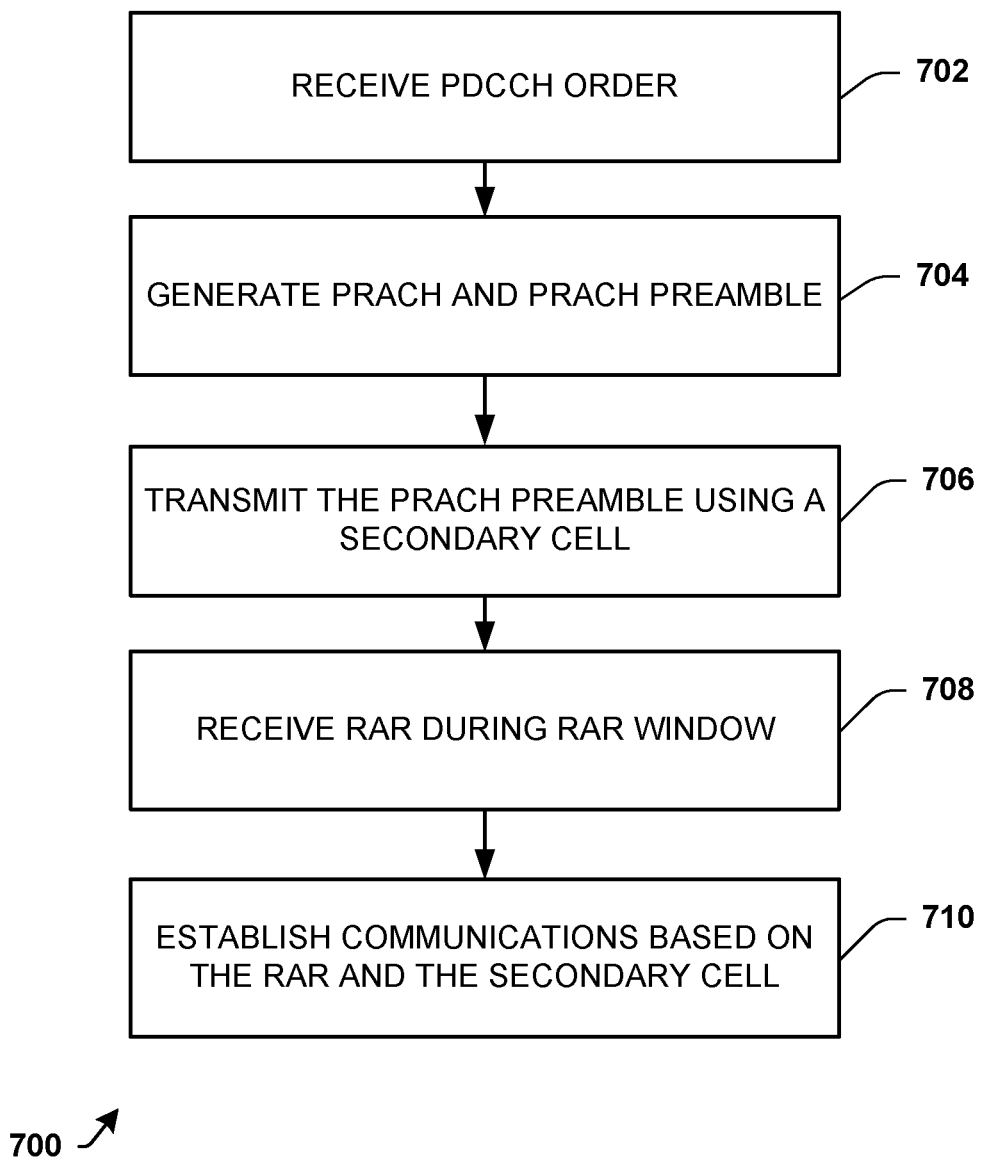
FIG. 7 is a flow diagram illustrating a method of operating a user equipment and utilizing unlicensed frequency bands in accordance with an embodiment.

FIG. 7 is a flow diagram illustrating a method 700 of operating a user equipment and utilizing unlicensed frequency bands in accordance with an embodiment. The method 700 facilitates communications utilizing unlicensed frequencies.

The method 700 can be used with the arrangement 100 and variations thereof.

The method 700 begins at block 702, wherein a PDCCH order is received. An eNodeB, such as the eNodeB 124 can generate a PDCCH that includes the PDCCH order. A UE device, such as the UE 102, can be configured to receive the PDCCH order.

The UE generates a PRACH preamble at block 704.

The UE transmits the PRACH preamble using an unlicensed frequency band at block 706 according to transmission approaches or conditions. The unlicensed frequency band can be associated with a secondary cell (SCell). The transmission conditions include retrying the transmission a selected number of times. For each transmission, an LBT is performed to determine if the transmission can proceed.

Alternately, the transmission falls back to being performed on a licensed frequency band. The licensed frequency band is associated with a primary cell (PCell).

The UE receives a RAR at block 708. The RAR specifies the resources that can be used for communications involving the UE and the eNodeB.

The UE and the eNodeB establish uplink communications at block 710. The communications are established based on the RAR and utilize the secondary cell.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 8:
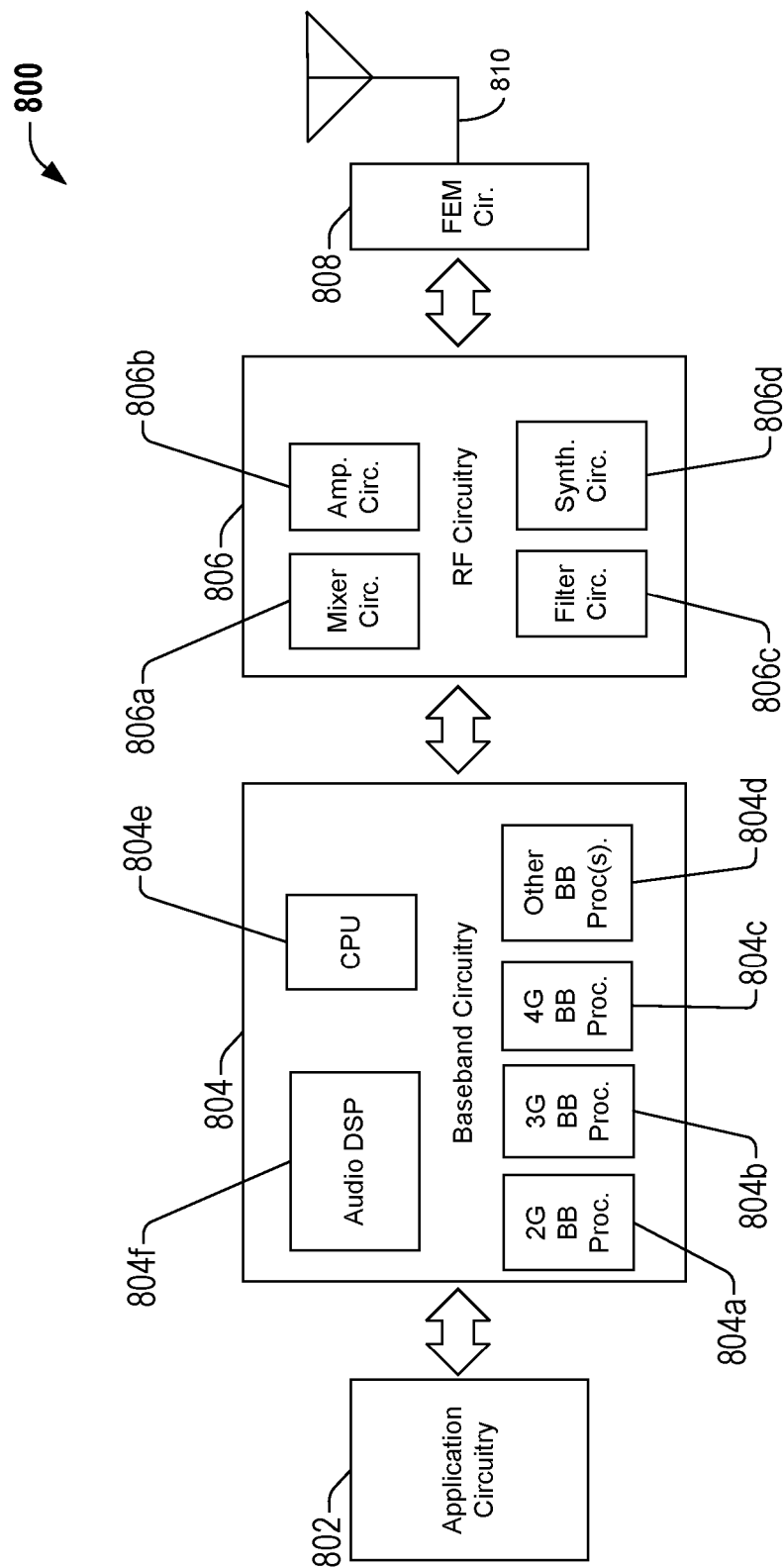
FIG. 8 illustrates example components of a User Equipment (UE) device.

Embodiments described herein can be implemented into a system using any suitably configured hardware and/or software. FIG. 8 illustrates, for one embodiment, example components of a User Equipment (UE) device 800. In some embodiments, the UE device 800 (e.g., the wireless communication device) can include application circuitry 802, baseband circuitry 804, Radio Frequency (RF) circuitry 806, front-end module (FEM) circuitry 808 and one or more antennas 810, coupled together at least as shown.

The application circuitry 802 can include one or more application processors. For example, the application circuitry 802 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The baseband circuitry 804 can include circuitry such as, but not limited to, one or more single-core or multi-core processors. The baseband circuitry 804 can include one or more baseband processors and/or control logic to process baseband signals received from a receive signal path of the RF circuitry 806 and to generate baseband signals for a transmit signal path of the RF circuitry 806. Baseband processing circuitry 804 can interface with the application circuitry 802 for generation and processing of the baseband signals and for controlling operations of the RF circuitry 806. For example, in some embodiments, the baseband circuitry 804 can include a second generation (2G) baseband processor 804a, third generation (3G) baseband processor 804b, fourth generation (4G) baseband processor 804c, and/or other baseband processor(s) 804d for other existing generations, generations in development or to be developed in the future (e.g., fifth generation (5G), 6G, etc.). The baseband circuitry 804 (e.g., one or more of baseband processors 804a-d) can handle various radio control functions that enable communication with one or more radio networks via the RF circuitry 806. The radio control functions can include, but are not limited to, signal modulation/demodulation, encoding/decoding, radio frequency shifting, etc. In some embodiments, modulation/demodulation circuitry of the baseband circuitry 804 can include Fast-Fourier Transform (FFT), precoding, and/or constellation mapping/demapping functionality. In some embodiments, encoding/decoding circuitry of the baseband circuitry 804 can include convolution, tail-biting convolution, turbo, Viterbi, and/or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 804 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804e of the baseband circuitry 804 can be configured to run elements of the protocol stack for signaling of the PHY, MAC, RLC, PDCP and/or RRC layers. In some embodiments, the baseband circuitry can include one or more audio digital signal processor(s) (DSP) 804f. The audio DSP(s) 804f can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 804 and the application circuitry 802 can be implemented together such as, for example, on a system on a chip (SOC).

In some embodiments, the baseband circuitry 804 can provide for communication compatible with one or more radio technologies. For example, in some embodiments, the baseband circuitry 804 can support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 804 is configured to support radio communications of more than one wireless protocol can be referred to as multi-mode baseband circuitry.

RF circuitry 806 can enable communication with wireless networks using modulated electromagnetic radiation through a non-solid medium. In various embodiments, the RF circuitry 806 can include switches, filters, amplifiers, etc. to facilitate the communication with the wireless network. RF circuitry 806 can include a receive signal path which can include circuitry to down-convert RF signals received from the FEM circuitry 808 and provide baseband signals to the baseband circuitry 804. RF circuitry 806 can also include a transmit signal path which can include circuitry to up-convert baseband signals provided by the baseband circuitry 804 and provide RF output signals to the FEM circuitry 808 for transmission.

In some embodiments, the RF circuitry 806 can include a receive signal path and a transmit signal path. The receive signal path of the RF circuitry 806 can include mixer circuitry 806a, amplifier circuitry 806b and filter circuitry 806c. The transmit signal path of the RF circuitry 806 can include filter circuitry 806c and mixer circuitry 806a. RF circuitry 806 can also include synthesizer circuitry 806d for synthesizing a frequency for use by the mixer circuitry 806a of the receive signal path and the transmit signal path. In some embodiments, the mixer circuitry 806a of the receive signal path can be configured to down-convert RF signals received from the FEM circuitry 808 based on the synthesized frequency provided by synthesizer circuitry 806d. The amplifier circuitry 806b can be configured to amplify the down-converted signals and the filter circuitry 806c can be a low-pass filter (LPF) or band-pass filter (BPF) configured to remove unwanted signals from the down-converted signals to generate output baseband signals. Output baseband signals can be provided to the baseband circuitry 804 for further processing. In some embodiments, the output baseband signals can be zero-frequency baseband signals, although this is not a requirement. In some embodiments, mixer circuitry 806a of the receive signal path can comprise passive mixers, although the scope of the embodiments is not limited in this respect.

In some embodiments, the mixer circuitry 806a of the transmit signal path can be configured to up-convert input baseband signals based on the synthesized frequency provided by the synthesizer circuitry 806d to generate RF output signals for the FEM circuitry 808. The baseband signals can be provided by the baseband circuitry 804 and can be filtered by filter circuitry 806c. The filter circuitry 806c can include a low-pass filter (LPF), although the scope of the embodiments is not limited in this respect.

In some embodiments, the mixer circuitry 806a of the receive signal path and the mixer circuitry 806a of the transmit signal path can include two or more mixers and can be arranged for quadrature downconversion and/or upconversion respectively. In some embodiments, the mixer circuitry 806a of the receive signal path and the mixer circuitry 806a of the transmit signal path can include two or more mixers and can be arranged for image rejection (e.g., Hartley image rejection). In some embodiments, the mixer circuitry 806a of the receive signal path and the mixer circuitry 806a can be arranged for direct downconversion and/or direct upconversion, respectively. In some embodiments, the mixer circuitry 806a of the receive signal path and the mixer circuitry 806a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 806 can include analog-to-digital converter (ADC) and digital-to-analog converter (DAC) circuitry and the baseband circuitry 804 can include a digital baseband interface to communicate with the RF circuitry 806.

In some dual-mode embodiments, a separate radio IC circuitry can be provided for processing signals for each spectrum, although the scope of the embodiments is not limited in this respect.

In some embodiments, the synthesizer circuitry 806d can be a fractional-N synthesizer or a fractional N/N+8 synthesizer, although the scope of the embodiments is not limited in this respect as other types of frequency synthesizers can be suitable. For example, synthesizer circuitry 806d can be a delta-sigma synthesizer, a frequency multiplier, or a synthesizer comprising a phase-locked loop with a frequency divider.

The synthesizer circuitry 806d can be configured to synthesize an output frequency for use by the mixer circuitry 806a of the RF circuitry 806 based on a frequency input and a divider control input. In some embodiments, the synthesizer circuitry 806d can be a fractional N/N+8 synthesizer.

In some embodiments, frequency input can be provided by a voltage controlled oscillator (VCO), although that is not a requirement. Divider control input can be provided by either the baseband circuitry 804 or the applications processor 802 depending on the desired output frequency. In some embodiments, a divider control input (e.g., N) can be determined from a look-up table based on a channel indicated by the applications processor 802.

Synthesizer circuitry 806d of the RF circuitry 806 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+8 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency ($f_{LO}$). In some embodiments, the RF circuitry 806 can include an IQ/polar converter.

FEM circuitry 808 can include a receive signal path which can include circuitry configured to operate on RF signals received from one or more antennas 880, amplify the received signals and provide the amplified versions of the received signals to the RF circuitry 806 for further processing. FEM circuitry 808 can also include a transmit signal path which can include circuitry configured to amplify signals for transmission provided by the RF circuitry 806 for transmission by one or more of the one or more antennas 810.

In some embodiments, the FEM circuitry 808 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 806). The transmit signal path of the FEM circuitry 808 can include a power amplifier (PA) to amplify input RF signals (e.g., provided by RF circuitry 806), and one or more filters to generate RF signals for subsequent transmission (e.g., by one or more of the one or more antennas 880.

In some embodiments, the UE device 800 can include additional elements such as, for example, memory/storage, display, camera, sensor, and/or input/output (I/O) interface.

It is appreciated that the described application circuitry 802, baseband circuitry 804, Radio Frequency (RF) circuitry 806, front-end module (FEM) circuitry 808 and one or more antennas 810 can also be utilized with an evolved Node B (eNodeB).

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is an apparatus configured to be employed within one or more user equipment (UE). The apparatus includes control circuitry and a transceiver. The control circuitry is configured to generate a physical random access channel (PRACH), wherein the PRACH includes a preamble for PRACH transmission using a license assisted access (LAA) secondary cell. The transceiver is coupled to the control circuitry and is configured to retry transmission of the PRACH on a listen before talk (LBT) failure based of the secondary cell.

Example 2 includes the subject matter of Example 1, including or omitting optional elements, where the PRACH is generated in response to a physical downlink control channel (PDCCH) order, where the PDCCH order identifies an unlicensed frequency band for a PRACH preamble transmission.

Example 3 includes the subject matter of any of Examples 1-2, including or omitting optional elements, wherein the transceiver is configured to receive a physical downlink control channel (PDCCH) order from an evolved Node B (eNodeB) on a primary cell, wherein the primary cell uses a licensed frequency band.

Example 4 includes the subject matter of any of Examples 1-3, including or omitting optional elements, wherein the transceiver is configured to receive the PDCCH order and a random access response (RAR) on the secondary cell.

Example 5 includes the subject matter of any of Examples 1-4, including or omitting optional elements, where the UE further includes a transceiver and the transceiver is configured to receive a PDCCH order and a random access response (RAR) using at least one of a primary cell and the secondary cell.

Example 6 includes the subject matter of any of Examples 1-5, including or omitting optional elements, where a PDCCH order transmission and a random access response (RAR) transmission are subject to one of a single interval LBT and Cat-4 LBT.

Example 7 includes the subject matter of any of Examples 1-6, including or omitting optional elements, where a higher priority cell is used for the PDCCH order transmission and/or the RAR transmission when Cat-4 LBT is performed for PDCCH order and/or RAR transmission, and the PDCCH order is multiplexed with a physical downlink shared channel (PDSCH) in a same subframe according to a Cat-4 LBT multiplexing rule.

Example 8 includes the subject matter of any of Examples 1-7, including or omitting optional elements, where the control circuitry receives a physical downlink control channel (PDCCH) order that identifies an unlicensed frequency band for the preamble for PRACH transmission.

Example 9 includes the subject matter of any of Examples 1-6, including or omitting optional elements, where the control circuitry is configured to receive a random access response (RAR) from a serving cell, wherein the serving cell is a LAA secondary cell.

Example 10 includes the subject matter of any of Examples 1-9, including or omitting optional elements, where wherein the control circuitry is configured to receive a random access response (RAR) within a random access response (RAR) window.

Example 11 includes the subject matter of any of Examples 1-10, including or omitting optional elements, where the control circuitry is configured to extend the RAR window on the RAR being associated with the secondary cell.

Example 12 includes the subject matter of any of Examples 1-11, including or omitting optional elements, where resources are allocated for the PRACH, a physical downlink control channel (PDCCH) order and/or a random access response (RAR), each on separate LAA secondary cells within a secondary timing advance group (sTAG), and the PRACH preamble, the PDCCH order, and/or the RAR are transmitted on one or more configured secondary cells, wherein the one or more configured secondary cells are sensed as being idle before the transmission.

Example 13 includes the subject matter of any of Examples 1-12, including or omitting optional elements, where when multiple component carriers are sensed to be idle by the control circuitry, a selection rule for the secondary cell is defined based on a cell index.

Example 14 is an apparatus configured to be employed within one or more evolved Node Bs (eNodeBs). The apparatus includes control circuitry and a transceiver. The control circuitry is configured generate a physical downlink control channel (PDCCH), wherein the PDCCH includes a PDCCH order for contention free PRACH transmission using a license assisted access (LAA) secondary cell, and generate a random access response (RAR) within a RAR window using the secondary cell. The transceiver is configured to retry transmission of the RAR on a listen before talk (LBT) failure based on the secondary cell.

Example 15 includes the subject matter of Example 14, including or omitting optional elements, where the RAR is generated based on a received physical random access channel (PRACH) preamble.

Example 16 includes the subject matter of any of Examples 14-15, including or omitting optional elements, where the transceiver is configured to transmit the PDCCH order on a primary cell.

Example 17 includes the subject matter of any of Examples 14-16, including or omitting optional elements, where the the transceiver is configured to perform a listen before talk (LBT) process prior to transmitting the PDCCH order and/or RAR on the secondary cell using unlicensed spectrum.

Example 18 includes the subject matter of any of Examples 14-17, including or omitting optional elements, where the transceiver is configured to perform a listen before talk (LBT) process prior to transmitting the PDCCH order on the secondary cell.

Example 19 includes the subject matter of any of Examples 14-18, including or omitting optional elements, where the transceiver is further configured to retry the transmission of the PDCCH order on the LBT process resulting in failure.

Example 20 includes the subject matter of any of Examples 14-19, including or omitting optional elements, wherein the transceiver is configured to fall back to using a primary cell using a licensed frequency band after a number of retries of the transmission of the PDCCH order using the secondary cell.

Example 21 includes the subject matter of any of Examples 14-20, including or omitting optional elements, where the transceiver of the eNodeB is configured to fall back to a primary cell for the transmission of the RAR based on a fallback condition, wherein the fallback condition includes continuous LBT failures within a time window, where the number of LBT failures or the time window is predefined, configured by layer 1 signaling, and/or higher layer signaling.

Example 22 is one or more computer-readable media having instructions that, when executed, cause one or more user equipment (UE) to generate a physical random access channel (PRACH) for contention free PRACH transmission using a license assisted access (LAA) secondary cell, wherein the PRACH includes a PRACH preamble; perform a listen before talk (LBT) on the secondary cell; transmit the PRACH preamble using the secondary cell on a success of the LBT; and retry transmission of the PRACH preamble using the secondary cell on a failure of LBT.

Example 23 includes the subject matter of Example 2, including or omitting optional elements, further comprising one or more computer-readable media having instructions that, when executed, further cause the one or more UEs to establish a predefined timing relationship between a PDCCH order the PRACH preamble transmission.

Example 24 includes the subject matter of any of Examples 22-23, including or omitting optional elements, further comprising one or more computer-readable media having instructions that, when executed, further cause the one or more UEs to transmit the PRACH preamble using a primary cell based on the fallback condition.

Example 25 is an apparatus configured to be employed within one or more user equipment (UE). The apparatus includes a means to configure and generate a physical random access channel (PRACH) for contention free PRACH transmission using a license assisted access (LAA) secondary cell, wherein the PRACH includes a preamble; a means to transmit the PRACH preamble using the secondary cell; a means to perform a listen before talk (LBT) on the secondary cell; a means to retry transmission of the PRACH preamble on the secondary cell on an LBT failure; and a means to retry transmission of the PRACH preamble on a secondary cell on the LBT failure of the secondary cell.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. An apparatus configured to be employed within one or more evolved Node Bs (eNodeBs), the apparatus comprising:

control circuitry configured to generate a physical downlink control channel (PDCCH), wherein the PDCCH includes a PDCCH order for contention free PRACH transmission using a license assisted access (LAA) secondary cell, and generate a random access response (RAR) within a RAR window using the secondary cell; and a transceiver configured to retry transmission of the PDCCH order upon a listen before talk (LBT) failure using a primary cell after a number of retries of the transmission of the PDCCH order using the secondary cell.

2. The apparatus of claim 1, wherein the RAR is generated based on a received physical random access channel (PRACH) preamble.

3. The apparatus of claim 1, wherein the transceiver is configured to transmit the PDCCH order on a primary cell.

4. The apparatus of claim 1, wherein the transceiver is configured to perform a listen before talk (LBT) process prior to transmitting the PDCCH order and/or RAR on the secondary cell using unlicensed spectrum.

5. The apparatus of claim 1, wherein the transceiver is configured to perform a listen before talk (LBT) process prior to transmitting the PDCCH order on the secondary cell.

6. The apparatus of claim 5, wherein the transceiver is further configured to retry the transmission of the PDCCH order on the LBT process resulting in failure.

7. The apparatus of claim 1, wherein the transceiver of the eNodeB is configured to fall back to a primary cell for the transmission of the RAR based on a fallback condition, wherein the fallback condition includes continuous LBT failures within a time window, where the number of LBT failures or the time window is predefined, configured by layer 1 signaling, and/or configured by higher layer signaling.

8. One or more non-transitory computer-readable media having instructions stored thereon that, when executed, cause one or more evolved Node Bs (eNodeBs) to:
  generate a physical downlink control channel (PDCCH), wherein the PDCCH includes a PDCCH order for contention free PRACH transmission using a license assisted access (LAA) secondary cell;
  generate a random access response (RAR) within a RAR window using the secondary cell; and
  retry transmission of the PDCCH order upon a listen before talk (LBT) failure using a primary cell after a number of retries of the transmission of the PDCCH order using the secondary cell.

9. The one or more computer-readable media of claim 8, wherein the RAR is generated based on a received physical random access channel (PRACH) preamble.

10. The one or more computer-readable media of claim 8, wherein the instructions, when executed, further cause the one or more eNodeBs to perform a listen before talk (LBT) process prior to transmission of the PDCCH order and/or RAR on the secondary cell using unlicensed spectrum.

11. The one or more computer-readable media of claim 8, wherein the instructions, when executed, further cause the one or more eNodeBs to perform a listen before talk (LBT) process prior to transmission of the PDCCH order on the secondary cell.

12. The one or more computer-readable media of claim 11, wherein the instructions, when executed, are further to cause the one or more eNodeBs to retry the transmission of the PDCCH order on the LBT process resulting in failure.

13. The one or more computer-readable media of claim 8, wherein the instructions, when executed, are further to cause the one or more eNodeBs to fall back to a primary cell for the transmission of the RAR based on a fallback condition, wherein the fallback condition includes continuous LBT failures within a time window, wherein the number of LBT failures or the time window is predefined, configured by layer 1 signaling, and/or configured by higher layer signaling.

* * * * *